Sept. 29, 1953        C. M. RIDER        2,653,811
SHOCK STABILIZER FOR VEHICLE AXLES
Filed Oct. 25, 1951
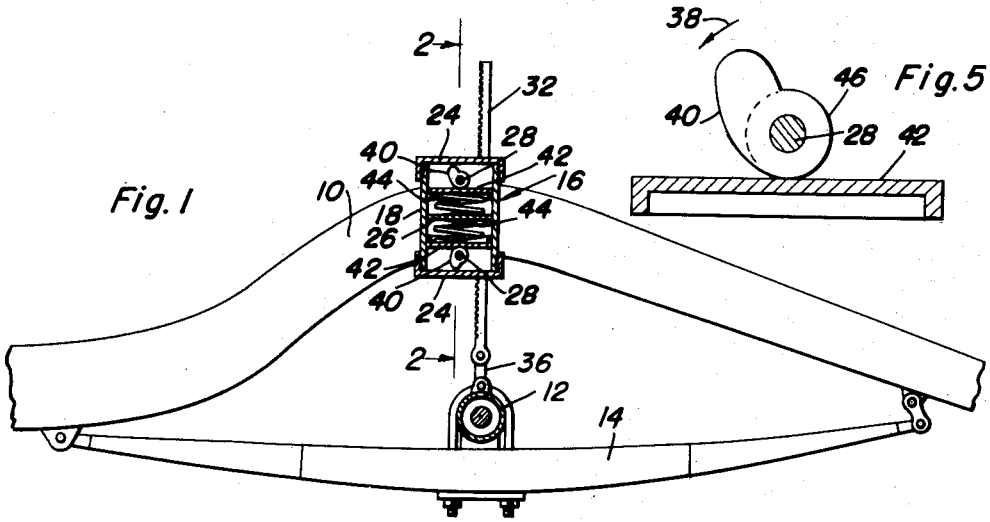
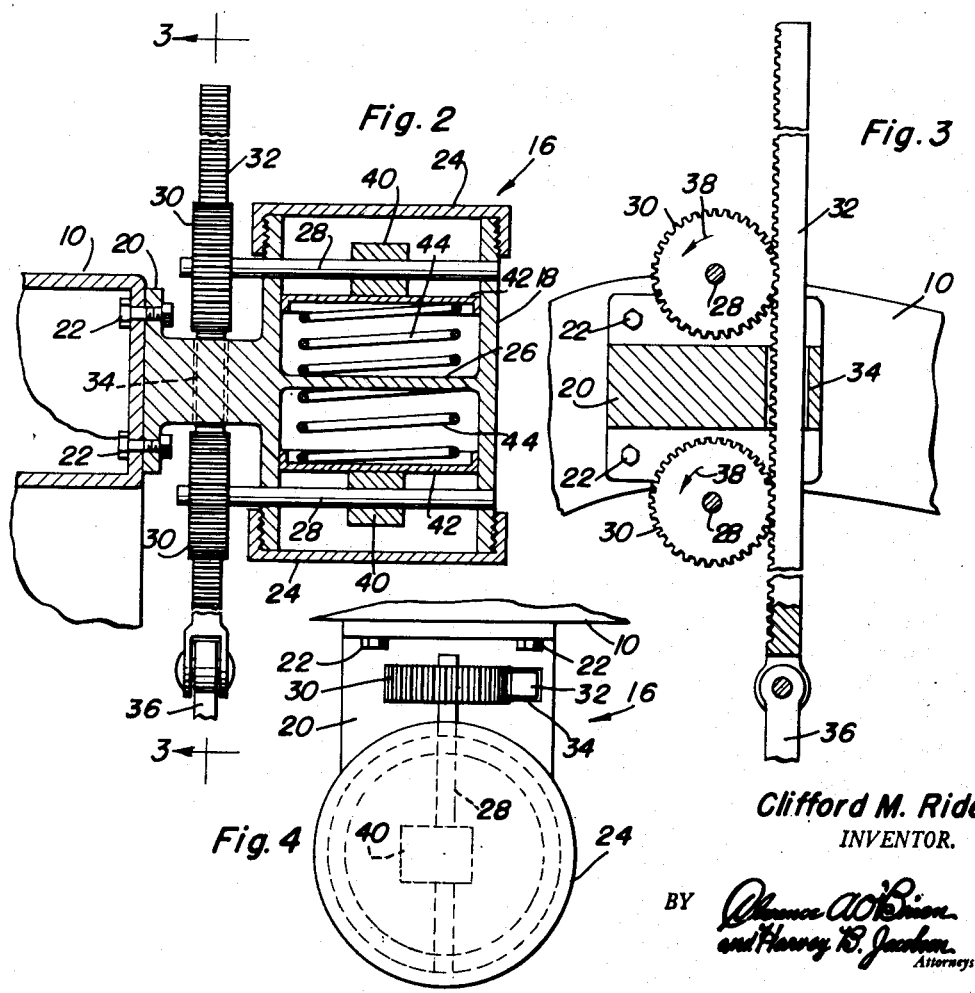
Clifford M. Rider
INVENTOR.

Patented Sept. 29, 1953

2,653,811

UNITED STATES PATENT OFFICE 2,653,811

SHOCK STABILIZER FOR VEHICLE AXLES

Clifford M. Rider, Kansas City, Mo.

Application October 25, 1951, Serial No. 253,096

5 Claims. (Cl. 267—8)

1

This invention relates to new and useful improvements and structural refinements in shock stabilizing devices for axles of automobiles, trucks and similar vehicles, and the principal object of the invention is to assist the usual spring suspension in absorbing road shocks to substantially minimize, if not altogether prevent transmission of such shocks to the vehicle body.

In effect, the invention is comparable to what is commonly known as a shock absorber, but an important structural distinction arises from the fact that while conventional shock absorbers are generally hydraulic, the instant invention utilizes coil springs rather than hydraulic fluid and, accordingly, obviates any possibility of fluid leakage and inoperability such as is frequently encountered when hydraulic shock absorbers are employed.

Moreover, the instant invention differs from a conventional shock absorber in that the latter merely offers resistance to a spontaneous movement of force, which resistance may be easily overcome by a gradual movement of force, while on the other hand, the instant device offers positive resistance to force regardless of whether it is spontaneous or gradual.

Some of the advantages of the invention reside in its simplicity of construction, in its efficient and dependable operation and in its adaptability for use in connection with front as well as rear axles of vehicles of different types.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view illustrating spring suspension of a vehicle axle from the frame, the invention being shown in section;

Figure 2 is a fragmentary sectional detail, on an enlarged scale, taken substantially in the plane of the line 2—2 of Figure 1;

Figure 3 is a fragmentary sectional detail, taken substantially in the plane of the line 3—3 in Figure 2;

Figure 4 is a fragmentary top plan view of the invention; and,

Figure 5 is a diagrammatic illustration showing the structural relationship of one of the cams to the associated pressure exerting member.

Like characters of reference are employed to designate like parts in the specification and throughout the several views.

2

Referring now to the accompanying drawings in detail, the general reference character 10 designates a vehicle frame from which an axle 12 is suspended in a conventional manner by a spring 14. It is to be understood that the axle 12 may be either the front axle or the rear axle of the vehicle, or it may be in the form of the usual lower control arm of the so-called individual front wheel suspension. In fact, the reference character 12 may designate any component which is subjected to rising and falling movement in response to irregularities of the road over which the vehicle travels. For illustrative purposes, the spring 14 is shown as being of the leaf type, but obviously, a coil spring may be present in accordance with existing practice.

In any event, the invention resides in the provision of a shock stabilizer which is designated generally by the reference character 16 and embodies in its construction a vertically disposed, substantially cylindrical housing 18 which is provided intermediate the ends thereof with a laterally projecting, flanged bracket 20 for securing the entire device to the frame 10 by suitable screws 22.

Flanged and screw threaded caps 24 are provided at the upper and lower ends of the housing 18 and a transverse partition 26 is provided intermediate the ends of the housing, as is best shown in Figure 2.

A pair of rotatable shafts 28 are journalled transversely in the housing 18 adjacent the end caps 24 and project outwardly from the housing, the projecting end portion of each shaft having rigidly secured thereto a pinion 30.

The two pinions 30 mesh with a vertically reciprocable toothed rack 32 which is slidable in a vertical bore 34 provided in the bracket 20 to afford a guide, so to speak, for the reciprocable rack, the lower end of the rack 32 being operatively connected by a link 36 to the axle 12 or to some other component which rises and falls in response to irregularity of the ground. It will be apparent from the foregoing that when the axle 12 rises, the rack 32 is slid upwardly and the pinions 30 and shafts 28 are rotated counter-clockwisely as shown at 38. Conversely, when the rack 32 is slid downwardly, the pinions 30 and shafts 28 are rotated clockwisely, that is, in a direction opposite to that illustrated by the arrows 38.

The shafts 28 have secured thereto cams 40 which are disposed within the housing 18 and engage a pair of pressure exerting members 42 which are slidable in the housing above and below the partition 26. Compression springs 44 are interposed between the partition 26 and the respective members 42 for urging the latter in engagement with the respective cams 40, and as is best shown in Figure 5, each of the cams 40 has a lobe of a progressively increasing pitch, and a substantially semi-circular portion 46. Still referring to Figure 5, it will be apparent that when the cam 40 is rotated in the direction of the arrow 38, the associated member 42 will be pressed downwardly by the cam. However, if the cam 40 is rotated clockwisely, that is, in a direction opposite to that shown by the arrow 38 in Figure 5, the semi-circular portion 46 of the cam will not impart any movement to the member 42.

Although the two cams 40 are similar in construction, they are secured to the respective shafts 28 in an opposite manner, that is, with the lobe of the upper cam extending upwardly and the lobe of the lower cam extending downwardly as shown in Figure 1, that is, while the axle 12 is in its normal or neutral position.

However, when the invention is placed in use and upward movement is imparted to the axle 12 by road shock, upward sliding of the rack 32 will rotate the shaft 28 as shown at 38 and while engagement of the semi-circular portion 46 of the lower cam with the associated member 42 will not transmit any upward pressure on the lower spring 44, the lobe of the upper cam will slide the associated member 42 downwardly to compress the upper spring 44 and stabilize the shock.

Conversely, when the axle 12 drops, the rack 32 sliding downwardly, will rotate the lower cam clockwisely to compress the lower spring in an upward direction against the partition 26 while the clockwisely rotating semi-circular portion of the upper cam will permit the upper member 42 to remain stationary.

It is to be noted that the two springs 44, functioning selectively and independently in this manner, will assist the main spring 14 in absorbing and stabilizing shock, regardless of the relative position of the axle 12 with respect to the frame 10.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In combination with a vehicle frame and an axle resiliently suspended therefrom, a shock stabilizer comprising an elongated housing secured to said frame, pressure exerting members slidable in opposite end portions of said housing, resilient means in the housing for urging said members outwardly, rotatable cams provided in opposite end portions of the housing and engaging the respective pressure exerting members, and means operatively connecting said cams to said axle, whereby upward and downward movement of the axle relative to the frame may cause inward sliding of the respective pressure exerting members in the housing against the action of said resilient means.

2. The device as defined in claim 1 wherein said means for operatively connecting said cams to said axle include a reciprocable toothed rack connected at one end thereof to the axle, rotatable shafts journalled transversely in said housing and having the respective cams secured thereto, and pinions provided on the respective shafts and engaging said rack.

3. In a shock stabilizer of the character described, the combination of a substantially cylindrical housing adapted to be secured to a vehicle frame, a pair of rotatable shafts journalled transversely in opposite end portions of said housing and projecting laterally therefrom, a pair of cams secured to the respective shafts, a pair of pressure exerting members slidable in the housing and engaged by the respective cams, resilient means provided in the housing between said members for urging the latter outwardly against the cams, a pair of pinions secured to the projecting portions of the respective shafts, and a reciprocable toothed rack adapted to be connected to a vehicle axle and operatively engaging said pinions, whereby said pressure exerting members may be selectively and independently slid inwardly in said housing against the action of said resilient means by sliding said rack in opposite directions.

4. The device as defined in claim 3 together with a laterally projecting bracket provided on said housing for mounting the same on a vehicle frame, said bracket being provided with a bore affording a guide passage for said reciprocable rack.

5. The device as defined in claim 3 together with a transverse partition provided intermediate the ends of said housing, said resilient means comprising a pair of compression springs positioned at the opposite sides of said partition and engaging the respective pressure exerting members.

CLIFFORD M. RIDER.

References Cited in the file of this patent
UNITED STATES PATENTS

| Number | Name | Date |
|---|---|---|
| 1,260,405 | Krussell | Mar. 26, 1918 |
| 1,567,929 | Ellis | Dec. 29, 1925 |
| 2,175,516 | Bugatti | Oct. 10, 1939 |